US011787643B2

(12) United States Patent
Namikawa

(10) Patent No.: US 11,787,643 B2
(45) Date of Patent: Oct. 17, 2023

(54) DIVERTING EQUIPMENT

(71) Applicant: DAIFUKU CO., LTD., Osaka (JP)

(72) Inventor: Makoto Namikawa, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 17/765,650

(22) PCT Filed: Jul. 9, 2020

(86) PCT No.: PCT/JP2020/026803
§ 371 (c)(1),
(2) Date: Mar. 31, 2022

(87) PCT Pub. No.: WO2021/075097
PCT Pub. Date: Apr. 22, 2021

(65) Prior Publication Data
US 2022/0380143 A1 Dec. 1, 2022

(30) Foreign Application Priority Data

Oct. 18, 2019 (JP) .................................. 2019-190623

(51) Int. Cl.
*B65G 21/22* (2006.01)
*B65G 47/68* (2006.01)
*B65G 13/10* (2006.01)

(52) U.S. Cl.
CPC .............. *B65G 47/68* (2013.01); *B65G 13/10* (2013.01); *B65G 21/22* (2013.01)

(58) Field of Classification Search
CPC ......... B65G 13/10; B65G 21/22; B65G 47/68
(Continued)

(56) References Cited

U.S. PATENT DOCUMENTS 3,219,166 A * 11/1965 Collins .................. B65G 13/10
198/782
3,523,618 A * 8/1970 Nielsen ................ B65G 47/681
198/349.8

(Continued)

FOREIGN PATENT DOCUMENTS

| JP | 7-257736 A | 10/1995 |
| JP | 2008-30860 A | 2/2008 |
| JP | 2013-28417 A | 2/2013 |

OTHER PUBLICATIONS

International Search Report from corresponding International Patent Application No. PCT/JP20/26803, dated Aug. 11, 2020.

*Primary Examiner* — Douglas A Hess
(74) *Attorney, Agent, or Firm* — KUSNER & JAFFE

(57) ABSTRACT

Diverting equipment for conveying an article on a conveyance path to a branching path formed so as to branch from the conveyance path. In the conveyance path, a branching section to the branching path has a plurality of conveyance rollers disposed in a conveyance direction H of the article in the conveyance path and a direction orthogonal to the conveyance direction H of the article in the conveyance path, the conveyance rollers forming the conveyance surface of the conveyance path and being rotatable around the axes of vertical shafts. Between the adjacent conveyance rollers disposed in the direction orthogonal to the conveyance direction H of the article, a gap is formed along the conveyance direction H of the article. In the gap, a rail capable of supporting the article is extended along the conveyance direction H of the article.

8 Claims, 3 Drawing Sheets

(58) Field of Classification Search
USPC ................. 198/369.5, 370.09, 782; 193/36
See application file for complete search history.

(56) References Cited

U.S. PATENT DOCUMENTS

| | | | | |
|---|---|---|---|---|
| 3,983,988 | A * | 10/1976 | Maxted ................. | B65G 47/54 |
| | | | | 198/782 |
| 4,264,002 | A * | 4/1981 | Van Der Schie ...... | B65G 13/08 |
| | | | | 198/361 |
| 4,598,815 | A * | 7/1986 | Adama ................. | B65G 47/54 |
| | | | | 198/782 |
| 7,111,722 | B2 * | 9/2006 | Burch .................... | B65G 17/24 |
| | | | | 198/779 |
| 9,290,333 | B2 * | 3/2016 | Skanse ................... | B65G 47/54 |
| 9,434,547 | B2 * | 9/2016 | Marshall .............. | B65G 17/345 |
| 10,053,300 | B2 * | 8/2018 | Itoh ........................ | B65G 15/12 |
| 10,239,274 | B2 * | 3/2019 | Sprague ............... | B30B 15/028 |
| 10,358,298 | B2 * | 7/2019 | Schroader ................ | B07C 3/08 |
| 10,543,986 | B1 * | 1/2020 | Sines ..................... | B65G 13/02 |

* cited by examiner

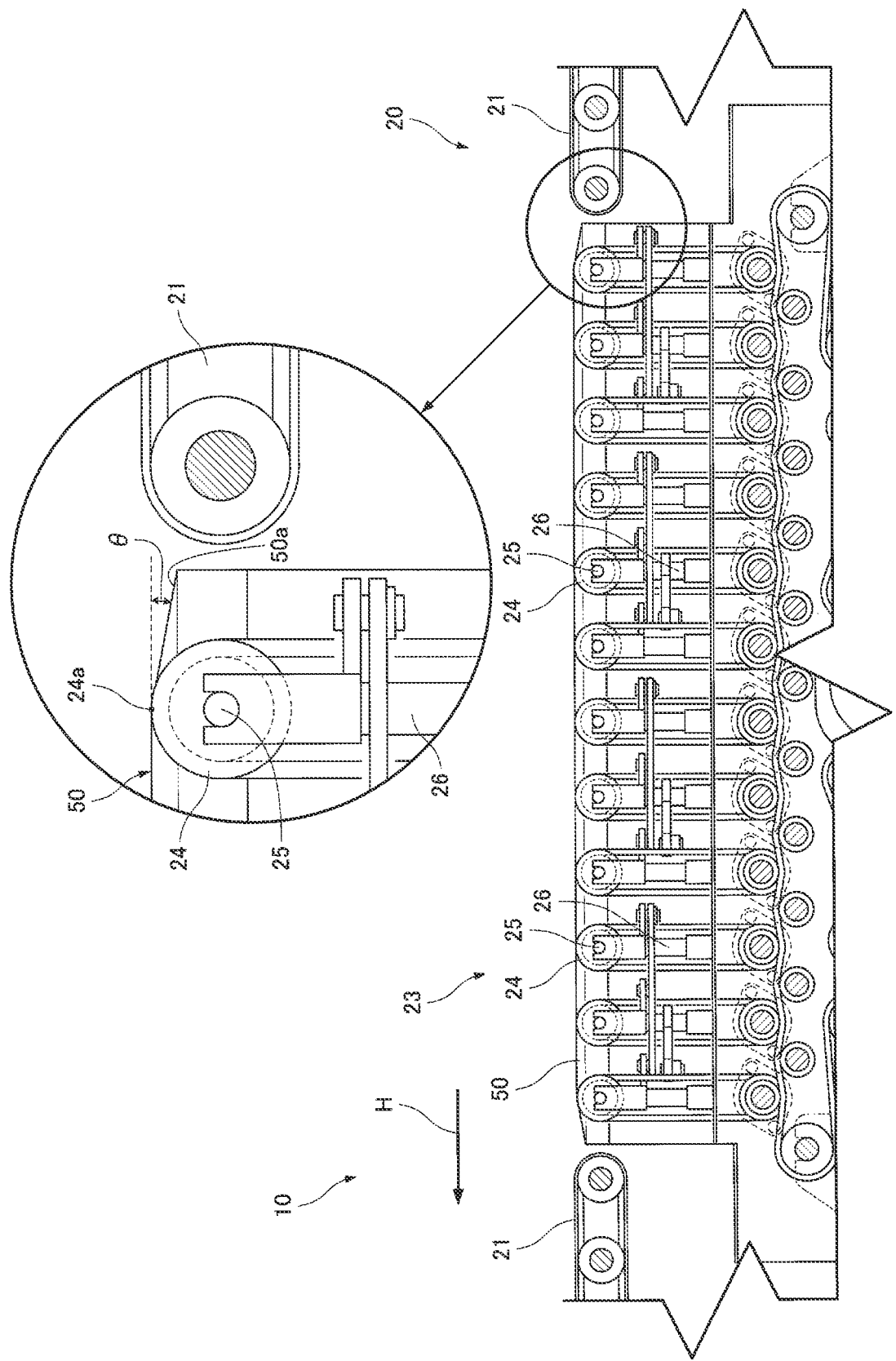

DIVERTING EQUIPMENT

FIELD OF THE INVENTION

The present invention relates to diverting equipment that can convey a conveyed article on a conveyance path to a branching path formed so as to branch from the conveyance path.

BACKGROUND OF THE INVENTION

As diverting equipment that can convey a conveyed article on a conveyance path to a branching path formed so as to branch from the conveyance path, equipment described in Japanese Patent Laid-Open No. 2008-30860 and Japanese Patent Laid-Open No. 2013-28417 is conventionally available.

In the diverting equipment of Japanese Patent Laid-Open No. 2008-30860, a branching path orthogonal to a conveyance path is formed on one side of a predetermined point (branching section) in the conveyance path. At the predetermined point, a plurality of conveyance rollers that form a conveyance surface are disposed at predetermined intervals in the direction of the conveyance path and a lateral direction with respect to the conveyance path. The conveyance rollers are rotatable around the longitudinal axes and are rotated at right angles by rotating devices in the direction of the conveyance path and the lateral direction.

The diverting equipment of Japanese Patent Laid-Open No. 2013-28417 includes a predetermined number of rollers that form a conveyance path for conveying articles and are placed in the conveyance direction of articles and the width direction of the conveyance path, and a cover that forms the conveyance path with the rollers. The rollers are rotatable around the horizontal axis and are rotatable around the vertical axis. The rotations of the rollers around the vertical axis change the conveyance direction of articles.

In the diverting equipment described in Japanese Patent Laid-Open No. 2008-30860, however, the conveyance rollers are disposed at predetermined intervals in the direction of the conveyance path and the lateral direction with respect to the conveyance path, thereby forming a gap between the adjacent conveyance rollers. Thus, when a small conveyed article is conveyed, the conveyed part may fall into the gap. Furthermore, in the conveyance of a conveyed article with small protrusions or the like at the bottom, the protrusions may fall into the gap when moving from one conveyance roller to another, causing an unstable behavior of the conveyed article during the conveyance.

In the diverting equipment described in Japanese Patent Laid-Open No. 2013-28417, a gap formed between adjacent conveyance rollers is covered with a cover, thereby preventing a conveyed part from falling into the gap. However, the maintenance of the equipment requires removal of the cover, resulting in complicated maintenance work.

Moreover, if diverting equipment includes conveyance rollers more densely disposed in a branching section of a conveyance path than in the diverting equipment of Japanese Patent Laid-Open No. 2013-28417, it is difficult to place the cover on the branching section. This cannot prevent a conveyed part from falling into the gap.

SUMMARY OF INVENTION

An object of the present invention is to provide diverting equipment that can stabilize the behavior of an article being conveyed in a branching section, in which a plurality of conveyance rollers are disposed, while improving workability during the maintenance of the equipment.

Solution to Problem

A solution to the technical problem of the present invention will be described below.

Specifically, diverting equipment of the present invention is diverting equipment capable of conveying a conveyed article on a conveyance path to a branching path formed so as to branch from the conveyance path, wherein in the conveyance path, a branching section to the branching path has a plurality of conveyance rollers disposed in the conveyance direction of the conveyed article in the conveyance path and a direction orthogonal to the conveyance direction of the conveyed article in the conveyance path, the conveyance rollers forming the conveyance surface of the conveyance path and being rotatable around longitudinal axes, a gap is formed between the adjacent conveyance rollers disposed in the direction orthogonal to the conveyance direction of the conveyed article in the conveyance path, the gap being formed along the conveyance direction of the conveyed article in the conveyance path, and in the gap, a rail capable of supporting the conveyed article is extended along the conveyance direction of the conveyed article in the conveyance path.

In the foregoing configuration, the conveyed article is conveyed by the rotations of the conveyance rollers while being supported by the rail.

The diverting equipment of the present invention, wherein the rail is shaped so as to support the conveyed article in line contact with the rail in the diverting equipment.

In the foregoing configuration, the conveyed article is conveyed in line contact with the rail.

The diverting equipment of the present invention, wherein the rail has an end on the conveyance upstream side such that the end is formed at a lower position than a contact position that comes into contact with the conveyed article on the conveyance roller disposed on the conveyance upstream side of the branching section in the diverting equipment.

In the foregoing configuration, the conveyed article comes into contact with the conveyance rollers prior to the end of the rail on the conveyance upstream side of the rail.

The diverting equipment of the present invention, wherein the rail is composed of a member having low frictional properties in the diverting equipment.

In the foregoing configuration, the conveyed article is supported by the rail composed of the member having low frictional properties.

Advantageous Effects of Invention

According to the diverting equipment of the present invention, the rail is provided in the gap formed between the adjacent conveyance rollers in the branching section, so that a continuous part for supporting the conveyed article is formable along the conveyance direction of the conveyed article in the conveyance path. Thus, the conveyed article is conveyable in the branching section while being supported all the time without falling into the gap. This can stabilize the behavior of the conveyed article being conveyed in the branching section. Even if the diverting equipment includes the conveyance rollers densely disposed in the branching section, the rail is providable in the gap according to the width of the gap, thereby preventing the conveyed article from falling into the gap also in the diverting equipment configured thus. Moreover, the branching section is not covered, facilitating the maintenance work of the diverting equipment.

BRIEF DESCRIPTION OF DRAWINGS

FIG. 3 is a schematic front view illustrating the diverting equipment according to the present invention.

DETAILED DESCRIPTION OF INVENTION

Diverting equipment 10 according to an embodiment of the present invention will be described below. The present invention is not limited to the diverting equipment 10, which will be described below.

Figure 1:
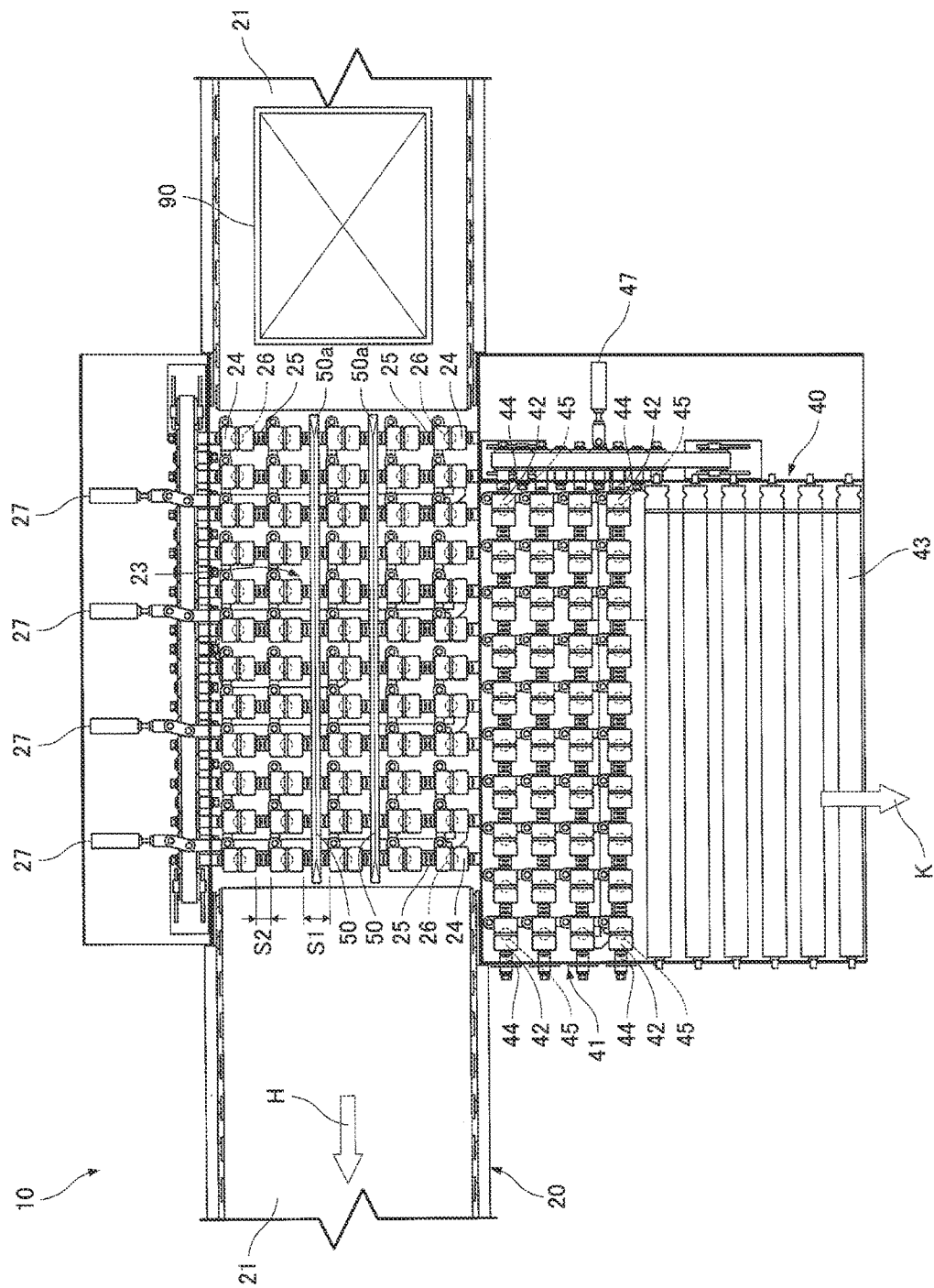
FIG. 1 is a schematic plan view illustrating diverting equipment according to the present invention.

As illustrated in FIG. 1, the diverting equipment 10 mainly includes a conveyance path 20 for conveying an article 90 (an example of "conveyed article") and a branching path 40 branching perpendicularly to the conveyance path 20. In the diverting equipment 10, the article 90 conveyed from the conveyance upstream side of the conveyance path 20 is sorted to the conveyance downstream side of the conveyance path 20 or the branching path 40 as necessary.

The conveyance path 20 is a main conveyance path for conveying the article 90. The conveyance path 20 includes a belt conveyor 21. The conveyance path 20 is not limited to the belt conveyor 21. For example, the conveyance path 20 may include a driven roller conveyor.

The branching path 40 is a conveyance path branching perpendicularly to the conveyance path 20 from a branching section 23 on the conveyance path 20. In this case, "perpendicularly" means an angle of 90° including a predetermined tolerance. An upstream-side end 41 of the branching path 40 is connected to one side of the conveyance path 20 (in FIG. 1, the left side in a conveyance direction H of the article 90 in the conveyance path 20 (hereinafter referred to as "the conveyance direction H of the article 90")). The upstream-side end 41 of the branching path 40 includes a plurality of diverting transport rollers 42. Others parts of the branching path 40 mainly include roller conveyors 43.

The diverting transport rollers 42 are supported so as to rotate with respect to horizontal roller shafts 44. The horizontal roller shafts 44 are disposed in a horizontal direction orthogonal to a conveyance direction K of the article 90 in the branching path 40 (hereinafter referred to as "the conveyance direction K of the article 90")). The diverting transport rollers 42 are supported with the horizontal roller shafts 44 by vertical shafts 45 and are rotatable about the axes of the vertical shafts 45. The vertical shafts 45 are disposed in a vertical direction orthogonal to the conveyance direction K of the article 90. The diverting transport rollers 42 rotating about the axes of the vertical shafts 45 rotate horizontally at a predetermined angle with respect to the conveyance direction K of the article 90 and guide the article 90, which is conveyed from the conveyance path 20, to the conveyance downstream side of the branching path 40. The diverting transport rollers 42 are connected to a drive unit 47 including a motor. The diverting transport rollers 42 are rotated by the horizontal roller shafts 44 and are rotated by the vertical shafts 45 in response to the driving of the drive unit 47.

As illustrated in FIG. 1, the branching section 23 is provided on the conveyance path 20. The branching section 23 is a branching part provided on the conveyance path 20 to convey the article 90, which is conveyed from the conveyance upstream side of the conveyance path 20, to the branching path 40. The upstream-side end 41 of the branching path 40 is connected to a side of the branching section 23.

The branching section 23 has a plurality of conveyance rollers 24 arranged. The roller surfaces of the conveyance rollers 24 form a conveyance surface for the article 90 on the conveyance path 20. The conveyance rollers 24 are supported so as to rotate with respect to horizontal roller shafts 25. The horizontal roller shafts 25 are disposed in a horizontal direction orthogonal to the conveyance direction H of the article 90. The conveyance rollers 24 are supported with the horizontal roller shafts 25 by vertical shafts 26 and are rotatable about the axes of the vertical shafts 26. The vertical shafts 26 are disposed in a vertical direction orthogonal to the conveyance direction H of the article 90. The conveyance rollers 24 are connected to a plurality of drive units 27, each including a motor. The conveyance rollers 24 are rotated by the horizontal roller shafts 25 and are rotated by the vertical shafts 26 in response to the driving of the drive units 27. The conveyance rollers 24 rotating about the axes of the vertical shafts 26 rotate horizontally at a predetermined angle with respect to the conveyance direction H of the article 90 and change the conveyance direction of the article 90 on the conveyance path 20.

Figure 2:
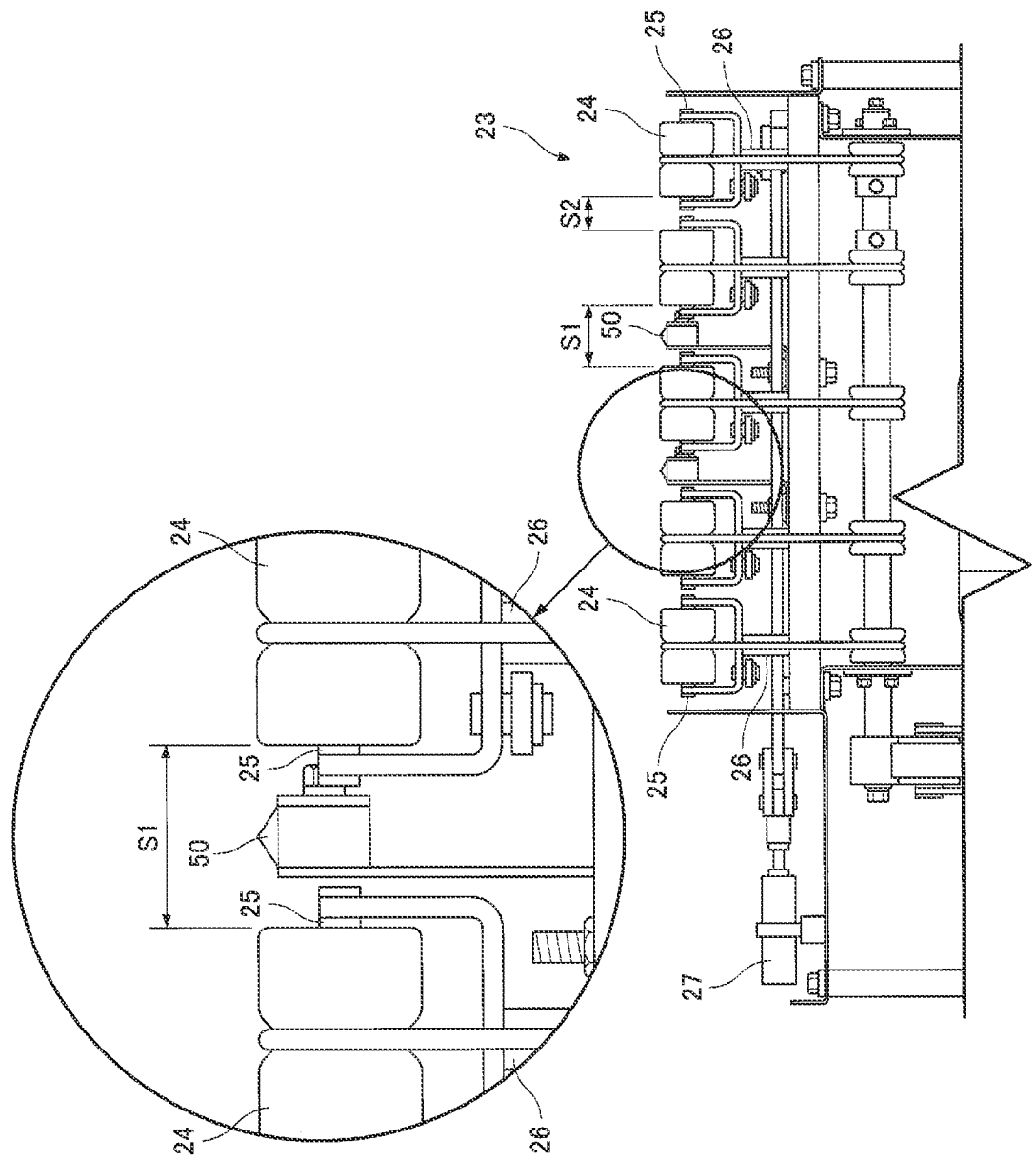
FIG. 2 is a schematic side view illustrating the diverting equipment according to the present invention.

The conveyance rollers 24 in the branching section 23 are arranged along the direction of the conveyance path 20 (the conveyance direction H of the article 90) and a lateral direction with respect to the conveyance path 20 (a horizontal direction orthogonal to the conveyance direction H of the article 90). The adjacent conveyance rollers 24 are disposed at predetermined intervals. As illustrated in FIGS. 1 and 2, particularly between the adjacent conveyance rollers 24 disposed in the lateral direction with respect to the conveyance path 20 (in the horizontal direction orthogonal to the conveyance direction H of the article 90), gaps S1 and S2 are formed such that the rotating and swinging conveyance rollers 24 do not come into contact with other adjacent conveyance rollers 24. The gaps S1 and S2 are formed along the conveyance direction H of the article 90.

In the branching section 23, in order to convey the small article 90 (e.g., the article 90 having a smaller width than the length of the two conveyance rollers 24 placed in parallel in the axial direction of the horizontal roller shaft 25), the conveyance rollers 24 are all disposed near the left and right sides of the branching section 23 (in the horizontal direction orthogonal to the conveyance direction H of the article 90). Thus, the gap S1 formed by the conveyance rollers 24 disposed at a central part of the branching section 23 has a larger width than the gap S2 formed by the conveyance rollers 24 disposed on the left and right sides of the branching section 23.

The branching section 23 has a plurality of rails 50 (two in FIGS. 1 and 2) that support the article 90 conveyed on the branching section 23. As illustrated in FIGS. 1 and 2, the rails 50 are extended in the gaps S1 along the conveyance direction H of the article 90. In other words, the rails 50 are extended in the wide gaps S1 formed at the central part of the branching section 23. The rails 50 are formed in the gaps S1 at the central part of the branching section 23, so that a continuous part for supporting the bottom of the article 90 is formed along the conveyance direction H of the article 90. Thus, the rails 50 always support the bottom of the article 90 conveyed along the conveyance direction H of the article 90. This prevents the article 90 from falling into the gap S1, thereby stabilizing the behavior of the conveyed article 90.

The rails 50 are composed of members having low frictional properties. Specifically, the rails 50 are made of poly-olefin resins such as ultrahigh molecular weight polyethylene or fluoroplastics such as polytetrafluoroethylene or are composed of members (for example, resins or metals other than poly-olefin resins and fluoroplastics) of which surfaces are coated with poly-olefin resins or fluoroplastics. The rails 50 composed of members having low frictional properties can reduce the influence of the rails 50 on the behavior of the conveyed article 90.

As illustrated in FIG. 2, the rails 50 are shaped so as to support the bottom of the article 90 in line contact with the rails 50. Specifically, the rails 50 are formed by angular (convex) members with the tops projecting at acute angles. The rails 50 formed by the angular (convex) members reduce a contact area with the article 90, thereby lowering a frictional resistance in the conveyance direction H of the article 90.

As illustrated in FIG. 3, the rail 50 has an end 50a on the conveyance upstream side (the conveyance upstream side of the branching section 23) such that the end 50a is formed at a lower position than a contact position 24a that comes into contact with the article 90 on the conveyance roller 24 disposed on the conveyance upstream side of the branching section 23 (a portion that comes into contact with the conveyed article 90 on the roller surface of the conveyance roller 24). Specifically, as illustrated in FIGS. 1 and 3, the end 50a on the conveyance upstream side of the rail 50 is tapered and is tilted downward at a predetermined angle θ. The predetermined angle θ is an angle set according to, for example, the size of the article 90 conveyed in the conveyance path 20 and a spacing between the belt conveyor 21 disposed on the conveyance upstream side of the branching section 23 and the conveyance rollers 24 disposed on the conveyance upstream side of the branching section 23. The rail 50 having the end 50a formed on the conveyance upstream side can prevent the article 90 from coming into contact with the end 50a of the rail 50 on the conveyance upstream side when the article 90 moves from the belt conveyor 21 disposed on the conveyance upstream side of the branching section 23 to the conveyance rollers 24 disposed on the conveyance upstream side of the branching section 23.

As has been discussed, according to the present embodiment, the rail 50 is provided in the gap S1 formed between the adjacent conveyance rollers 24 in the branching section 23, so that a continuous part for supporting the article 90 is formable along the conveyance direction H of the article 90 in the conveyance path 20. Thus, the article 90 is conveyable in the branching section 23 while being supported all the time without falling into the gap S1. This can stabilize the behavior of the article 90 conveyed in the branching section 23. Even if the diverting equipment 10 includes the conveyance rollers 24 densely disposed in the branching section 23, the rail 50 is providable in the gap S1 according to the width of the gap S1, thereby preventing the article 90 from falling into the gap S1 also in the diverting equipment 10 configured thus. Moreover, the branching section 23 is not covered, facilitating the maintenance work of the diverting equipment 10.

In the present embodiment, the rails 50 are formed by angular (convex) members with the tops projecting at acute angles. The shapes of the rails 50 are not limited thereto. For example, the rails 50 may be formed by members with the curved tops. In the present invention, the rails 50 are preferably shaped so as to support the bottom of the article 90 in line contact with the rails 50. If the bottom of the conveyed article 90 is supportable, the rails 50 may be formed by members that can support the bottom of the article 90 in surface contact with the rails 50 (for example, the rails 50 may be formed by members with the flat tops).

In the present embodiment, the rail 50 is extended only in the gap S1, but the configuration is not limited thereto. The rails 50 may be extended in both of the gap S1 and the gap S2.

In the present embodiment, the branching path 40 is formed on one side of the conveyance path 20 (the left side of the conveyance path 20 in the conveyance direction H), but the configuration is not limited thereto. The branching path 40 may be formed on each side of the conveyance path 20. Alternatively, the branching path 40 may be formed perpendicular to the conveyance path 20. Moreover, the branching path 40 is not limited to a path branching perpendicularly to the conveyance path 20. The angle with respect to the conveyance path 20 is not particularly limited as long as the branching path can convey the article 90 from the conveyance path 20.

REFERENCE SIGNS LIST

10 Diverting equipment
20 Conveyance path
23 Branching section
24 Conveyance roller
26 Vertical shaft
40 Branching path
50 Rail
90 Article (conveyed article)
H Article conveyance direction
S1 Gap

What is claimed is:

1. Diverting equipment capable of conveying a conveyed article on a conveyance path to a branching path formed so as to branch from the conveyance path,
   wherein in the conveyance path, a branching section to the branching path has a plurality of conveyance rollers disposed in a conveyance direction of the conveyed article in the conveyance path and a direction orthogonal to the conveyance direction of the conveyed article in the conveyance path, the conveyance rollers forming a conveyance surface of the conveyance path and being rotatable around longitudinal axes,
   a gap is formed between adjacent ones of the conveyance rollers disposed in the direction orthogonal to the conveyance direction of the conveyed article in the conveyance path, the gap being formed along the conveyance direction of the conveyed article in the conveyance path, and
   in the gap, a rail capable of supporting the conveyed article is extended along the conveyance direction of the conveyed article in the conveyance path.

2. The diverting equipment according to claim 1, wherein the rail is shaped so as to support the conveyed article in line contact with the rail.

3. The diverting equipment according to claim 2, wherein the rail has an end on a conveyance upstream side such that the end is formed at a lower position than a contact position that comes into contact with the conveyed article on the conveyance roller disposed on a conveyance upstream side of the branching section.

4. The diverting equipment according to claim 3, wherein the rail is composed of a member having low frictional properties.

5. The diverting equipment according to claim 2, wherein the rail is composed of a member having low frictional properties.

6. The diverting equipment according to claim 1, wherein the rail has an end on a conveyance upstream side such that the end is formed at a lower position than a contact position that comes into contact with the conveyed article on the conveyance roller disposed on a conveyance upstream side of the branching section.

7. The diverting equipment according to claim 6, wherein the rail is composed of a member having low frictional properties.

8. The diverting equipment according to claim 1, wherein the rail s composed of a member having low frictional properties.

* * * * *